US005201980A

United States Patent [19]

Chandler et al.

[11] Patent Number: 5,201,980

[45] Date of Patent: Apr. 13, 1993

[54] METHOD FOR MAKING LINER FOR INTERMENT CONTAINER

[75] Inventors: Warren Chandler; Kyle Coffman, both of Marshall, Ill.

[73] Assignee: Doric Products, Inc., Marshall, Ill.

[21] Appl. No.: 883,286

[22] Filed: May 14, 1992

Related U.S. Application Data

[62] Division of Ser. No. 624,723, Dec. 10, 1990, Pat. No. 5,140,728.

[51] Int. Cl.[5] .......... B32B 31/14

[52] U.S. Cl. .......... 156/196; 156/242; 156/245; 156/306.6; 156/285; 156/313; 27/1; 27/3; 27/7; 27/29; 27/35; 29/613; 264/250; 427/207.1; 427/407.3; 427/407.1; 427/412.1

[58] Field of Search .......... 156/196, 242, 245, 306.6, 156/307.3, 313, 285; 27/1, 3, 7, 29, 35; 264/250; 29/613; 427/207.1, 402, 407.1, 407.3, 412.1, 412.3

[56] References Cited

U.S. PATENT DOCUMENTS

| | | | |
|---|---|---|---|
| Re. 29,114 | 1/1977 | McQuestion | 27/35 |
| 2,448,923 | 9/1948 | Skolnik | 27/3 |
| 2,806,278 | 9/1957 | Crump | 27/35 |
| 2,810,947 | 10/1957 | Johnson | 27/35 |
| 2,848,780 | 8/1958 | Gosnell . | |
| 3,159,901 | 12/1964 | Harrington . | |
| 3,787,545 | 1/1974 | Chandler et al. | 264/135 |
| 3,839,768 | 10/1974 | McQuestion | 27/35 |
| 3,938,287 | 2/1976 | Guachard | 27/11 |
| 4,060,581 | 11/1977 | Darby et al. | 264/131 |
| 4,128,981 | 12/1978 | Juba | 52/309.3 |
| 4,253,220 | 3/1981 | Work | 27/35 |
| 4,261,083 | 4/1981 | Darby et al. | 127/35 |
| 4,314,390 | 2/1982 | Darby et al. | 27/35 |
| 4,315,964 | 2/1982 | Ozaki et al. | 156/313 |
| 4,335,298 | 6/1982 | Newhold, Jr. | 29/613 |
| 4,476,657 | 10/1984 | Juba et al. | 52/139 |
| 4,812,194 | 3/1989 | Pelz | 156/307.3 |
| 4,827,581 | 5/1989 | Davidson | 27/3 |
| 4,877,476 | 10/1989 | Wolf | 156/307.3 |
| 4,890,366 | 1/1990 | Schaapveld | 27/7 |

*Primary Examiner*—Caleb Weston

*Attorney, Agent, or Firm*—Baker & Daniels

[57] ABSTRACT

The invention comprises a liner for an interment container and methods for manufacturing the same are provided. A plastic layer and a layer including fiberglass are laminated to each other to provide advantages provided by neither material alone. An acrylic material layer between the plastic layer and the fiberglass layer prevents or minimizes delamination.

4 Claims, 2 Drawing Sheets

METHOD FOR MAKING LINER FOR INTERMENT CONTAINER

CROSS REFERENCE TO RELATED APPLICATIONS

This is a division of application Ser. No. 07/624,723 filed Dec. 10, 1990, now U.S. Pat. No. 5,140,728.

BACKGROUND OF THE INVENTION

Despite its antiquity, the process of burial of human and animal remains is still a source of unsolved problems and an area of technology in need of innovative solutions. The needs exhibit a unique combination of satisfaction of emotional desires, cultural and religious imperatives, aesthetic considerations and modern health and anti-pollution regulations.

It is often desired to display the remains of the deceased reposing in an aesthetically pleasing surrounding for memorial services or other rituals. The materials in contact with the remains are desirably fabrics pleasing in appearance but these are subject to rapid deterioration after interment. The basic containers for the remains and such materials, referred to as caskets, are usually of wood, metal, plastic, fiberglass or other materials such as cultured marble which are finished to provide an aesthetically pleasing appearance. It is desirable for caskets to be light in weight to facilitate movement of the remains generally and, more particularly, in a dignified fashion during ceremonies. Generally such characteristics are at least to some extent incompatible with structural strength and durability after interment. Wood and metal caskets are particularly subject to underground deterioration.

Consequently, in many jurisdictions it is required that caskets be interred within burial vaults, usually of concrete, designed to withstand the immediate forces of covering the remains with earth, the continuing static load of the earth and movement of equipment over the gravesite. Thus, subsidence of the earth over the gravesite and the possibility of toppling of nearby monuments are minimized and crushing of the casket and remains is prevented.

In many cultures it is considered desirable that the remains be preserved as long as possible even after burial. This desire is consistent with the present-day need to prevent the products of the inevitable putrefaction of the remains, such as formic acid, from escaping from the gravesite and contaminating the environment. Similar needs and desires exist with respect to above ground interments where vaults may not be required for support reasons. Neither concrete vaults nor most of the caskets described above are impervious to the entry or exit of liquids, gases or organisms which could defeat these needs and desires.

Therefore both vaults and caskets, both referred to herein as interment containers, have been provided on their interiors with linings of various materials in attempts to meet those needs. The addition of linings of any material to a structure is a labor-intensive and expensive process. Therefore, an important objective of improvements in this art is to provide layered preformed structures using processes such as vacuum forming, casting or molding, which are less labor intensive than custom construction, and which produce a product which can serve as an interment container. These preformed structures may be used with or without additional work or materials being added. Herein, such structures are referred to as interment container liners in accordance with general usage, and are to be distinguished from "linings" which are merely attached to the interior or other structures. However, it should be understood that a structure in accordance with this invention may serve as an interment container without addition in some uses and the use of the word "liner" should not be construed to limit the invention.

Various materials have been proposed and used for both interment container linings and liners. For example, plastic liners are shown and referenced in U.S. Pat. No. 4,314,390. In this patent it is suggested that plastic liners can serve as an inner mold, outer mold or both for a concrete or aggregate vault. Lining materials or interment container liners of fiberglass or fiberglass containing mixtures have also been proposed. See, for example, U.S. Pat. No. 3,839,768. The use of either plastic or fiberglass liners is disclosed in U.S. Pat. No. 3,787,545. These references are offered as examples and are not to be considered exhaustive of the art.

Both plastic and fiberglass have relative advantages and disadvantages as materials for interment container liners. Plastic is more easily extruded into a sheet and vacuum formed into a container or liner shape. Its cure time, if any, is short and it is light in weight, reducing shipping costs. However it is not as strong or rigid as fiberglass and is often penetrable by water, gases and microorganisms. Fiberglass compositions on the other hand are usually impervious to water, gases and microorganisms. They are stronger and more rigid than plastic and are generally considered to result in a superior product. However, the liners which can be constructed using them are substantially heavier than comparable liners of plastic, resulting in increased shipping costs, and take longer to manufacture, in part because of long cure times, which increases their cost.

Viewing the prior art, as exemplified by the patents mentioned above, and the relative advantages and disadvantages of various materials for interment container liners, applicant conceived of a liner which would combine the advantages of both plastic and fiberglass and in which the disadvantages of one material would be compensated by the advantages of the other by laminating a plastic and a fiberglass layer to one another to form the liner. Applicant's search of the art, even after the invention, has not discovered any suggestion of this combination.

Applicant's initial discovery was not without problems. Layers of fiberglass composition and plastic appeared to have a tendency to delaminate, thus forming voids between the layers which would possibly defeat the purposes of the burial interment container. After investigation, Applicant discovered that in a completely dissimilar art, that of refrigerators, fiberglass was used as a thermal insulating material, not as a material impervious to fluid transfer and not usually as part of a composition. Yet in this application it was known to be laminatable to plastic layers without resulting delamination. Applicant discovered that the key to preventing delamination was the use of an intermediate layer of acrylic material between the fiberglass and the plastic.

SUMMARY OF THE INVENTION

The present invention provides an interment container liner and methods of making the same using a laminate of a plastic material and a fiberglass composition and further including an intermediate layer of acrylic material.

DETAILED DESCRIPTION

Figure 1:
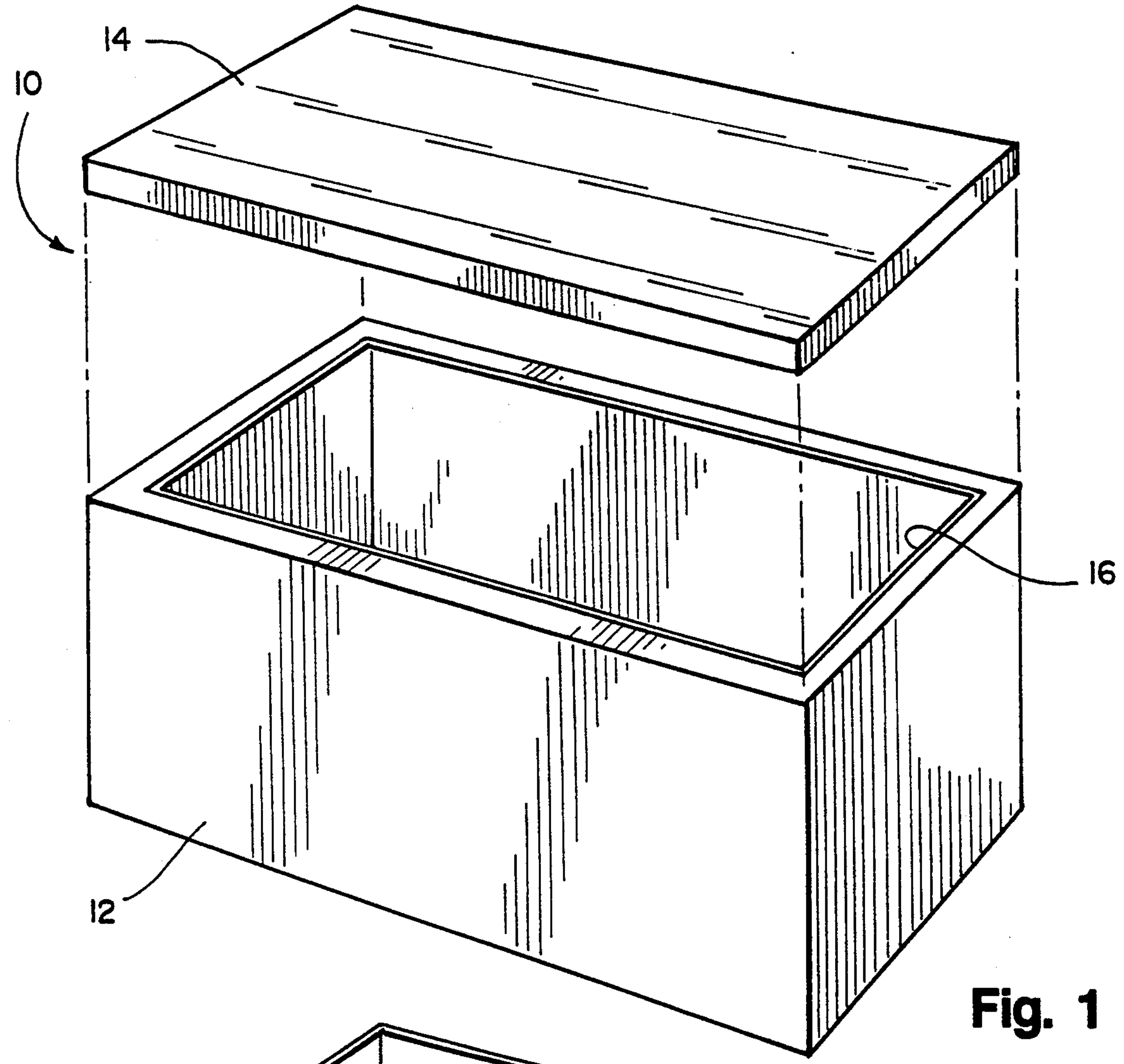
FIG. 1 is an exploded perspective view of an interment container showing an interment container liner.

As shown in FIG. 1, an interment container 10 generally comprises a box or base portion 12 in which the remains rest and a lid or cover portion 14 for closure. The two portions may be completely separate as shown or may be attached by hinges or similar devices and sealing means (not shown). Both the box and lid portions may include interment container liners 16 and this term should be construed to mean a liner for either or both elements.

For ease of illustration, the interment container liner 16 (or as sometimes referred to herein, "the liner") is only shown on the box portion. As previously noted in the part entitled "BACKGROUND OF THE INVENTION" both internal and external liners or only one of each may be provided. For simplicity the drawings show only an internal liner.

Figure 2:
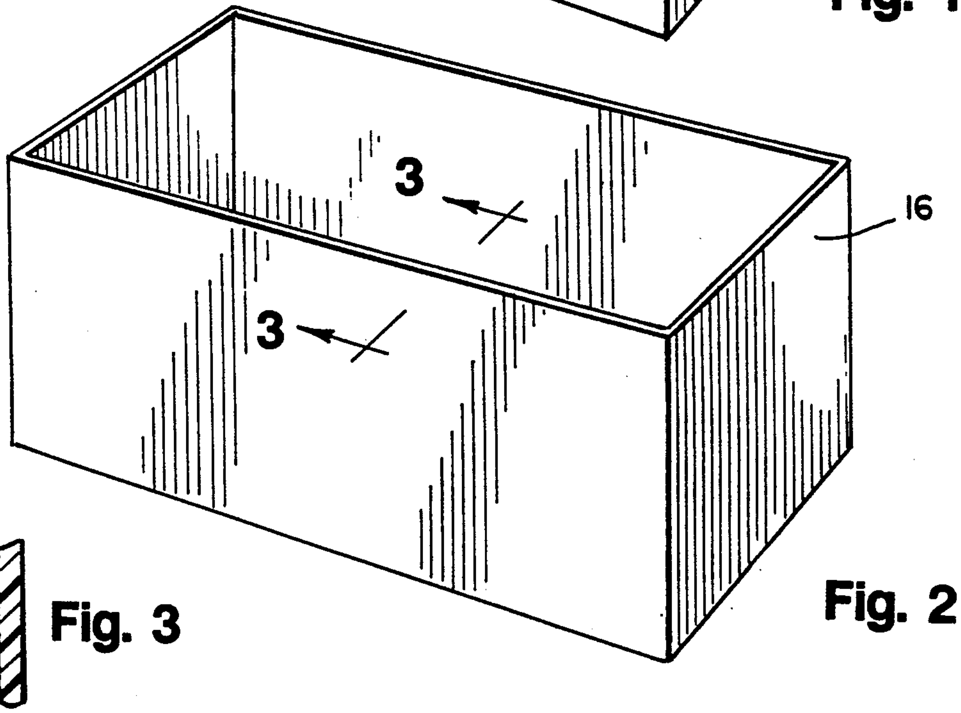
FIG. 2 is a perspective view of an interment container liner in accordance with the invention.
Figure 3:
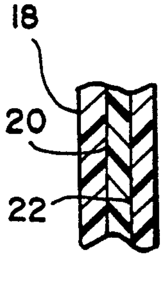
FIG. 3 is a fragmentary cross-sectional view of the liner shown in FIG. 2 taken on line 3—3 in FIG. 2.

The general form of the liner is shown in FIG. 2. Details of shape and design, of course, are a matter of choice. FIG. 3 shows the liner's internal structure by way of a cross-sectional view. The liner consists of a base layer 18 of plastic such as polystyrene, polyethylene or ABS plastic material. In the preferred embodiment, in contact with the plastic layer 18 on one side thereof is a layer 20 of acrylic material such as acrylic resin possibly including methyl ethyl ketone, or toluene. In contact with the acrylic layer on the opposite side from the plastic layer is a layer 22 including fiberglass, more particularly chopped filaments of fiberglass. Layer 22 also includes a polyester resin and a catalyst for hardening and curing. Layer 22 may also include materials such as limestone powder used as a filler, pigment for coloring or other additives. In what presently appears to be a less than preferred embodiment the acrylic material may be omitted.

As set forth under BACKGROUND OF THE INVENTION, the illustrated interment container liner combines the virtues of plastic and fiberglass liners while offsetting the respective disadvantages of liners made solely of one of the two materials. The acrylic layer of the preferred embodiment has the further advantage of minimizing or eliminating the possibility of delamination of the plastic and fiberglass layers.

The superiority of the interment container liner according to the present invention can be seen from the following tabular comparison of liners made of pure conventional fiberglass and those according to the present invention.

| | Pure Conventional Fiberglass | Present Invention |
|---|---|---|
| Box or Body Weight | 32-35 lb | 8 lb fiberglass plus 21 lb plastic and acrylic equals 29 lb |
| Lid Weight | 10-11 lb | 4 lb fiberglass plus 7 lb plastic and acrylic equals 11 lb |
| Manufacturing time per unit | $83\frac{1}{3}$ minutes | 22 minutes |
| Daily output | 27 units | 70 units |

As compared to a pure conventional plastic liner, the liner of the present invention is stronger, more rigid and more impervious to gas, liquid and microorganisms.

Figure 4:
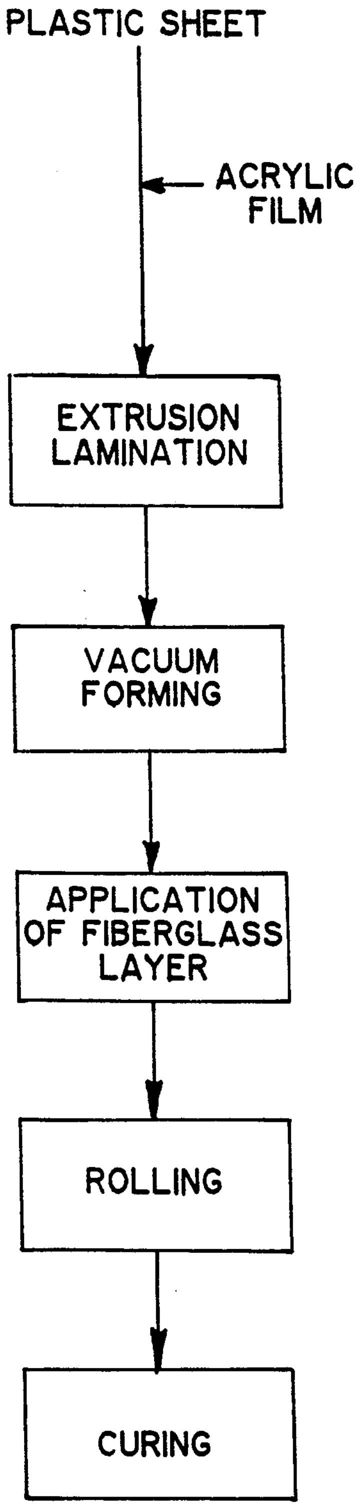
FIGS. 4-6 are block diagrams illustrating processes for manufacturing the liner shown in FIGS. 1-3.
Figure 5:
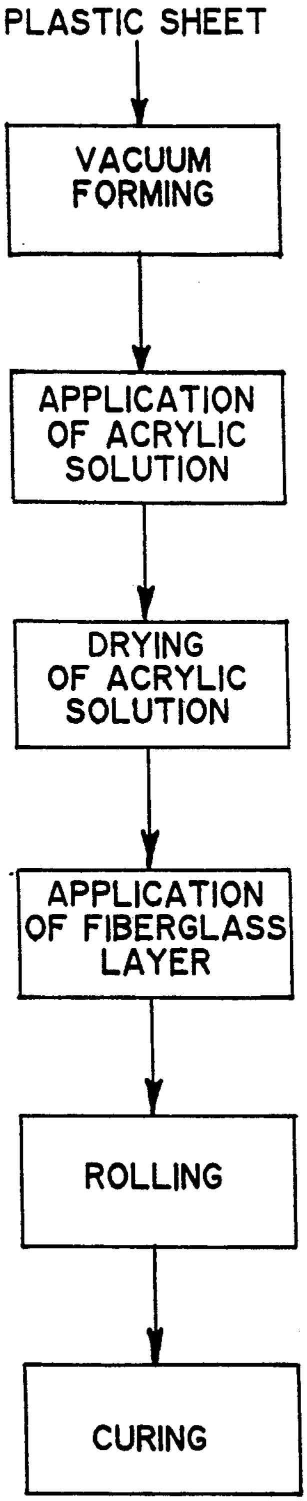
Figure 6:
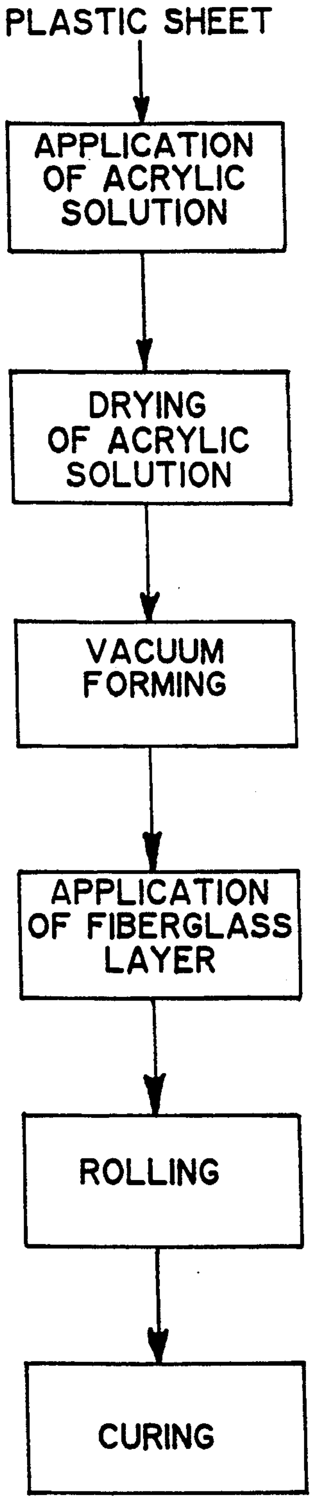

FIGS. 4-6 illustrate alternative methods of manufacturing an interment container liner according to the invention.

As shown in FIG. 4, a plastic sheet previously manufactured, as by extrusion, is mated to a preformed sheet of an acrylic material. The plastic sheet, as previously noted, may be of polystyrene, polyethylene, ABS plastic, or other suitable material. The two sheets are passed through pressure rollers in an extrusion/lamination machine, possibly being subjected to heat as necessary to provide bonding and lamination. The laminated plastic/acrylic sheet is then subjected to vacuum forming to produce the three dimensional form of the interment container liner. A layer of a fiberglass composition is then applied on the acrylic layer by hand or by spraying. The fiberglass composition layer includes chopped filaments of glass fibers, polyester resin for binding, and a catalyst for hardening and curing. Optionally, or as needed, a filler such as limestone powder and a pigment for color may also be applied. The fiberglass layer is then subjected to pressure as by rolling to promote mixing and interlocking of the glass filaments. Any need trimming of excess materials is done and the product is allowed to cure before shipment.

FIG. 5 illustrates a process similar in broad outline to that shown in FIG. 4. Here, however, the extruded plastic sheet without any other component is first vacuum formed into the desired shape. Then an acrylic solution, rather than a film is applied to one side of the plastic. An appropriate solution comprises acrylic resin, methyl ethyl ketone and toluene which may be applied by spraying, brushing or rolling. After the acrylic solution has been allowed to dry, the steps of application of a fiberglass layer, rolling, trimming if necessary, and curing proceed as shown and described for FIG. 4.

FIG. 6 illustrates another variation of the process wherein the acrylic solution as described in connection with FIG. 5 is applied to the plastic sheet during the process of its extrusion. This application may also be by spraying, brushing or rolling. After the solution has dried, the steps proceed as shown in FIG. 5, namely vacuum forming, application of the fiberglass layer, rolling, trimming if necessary, and curing.

Although the foregoing has described various embodiments of the invention in detail, many of these details may be varied without departing from the scope of the invention.

I claim:

1. A method of manufacturing an interment container liner comprising providing a first plastic layer, providing a second layer including glass fibers, providing a third layer comprising an acrylic material between said first layer and said second layer, and laminating the first, second and third layers to one another and forming an interment container liner from the resulting lamination.

2. A method according to claim 1 wherein the acrylic material comprises an acrylic film.

3. A method of manufacturing an interment container liner comprising providing a first plastic layer, forming said first layer into the shape of an interment container liner, applying a layer of an acrylic solution to said shaped liner, drying said acrylic solution and applying a layer including glass fibers over said dried acrylic solution.

4. A method of manufacturing an interment container liner comprising providing a first plastic layer, applying a layer of an acrylic solution to said first layer, drying said acrylic solution, forming said first and second layers into the shape of a liner and applying a layer including glass fibers to said liner over said dried acrylic solution.

* * * * *